(12) United States Patent
Lai et al.

(10) Patent No.: US 11,307,390 B2
(45) Date of Patent: Apr. 19, 2022

(54) OPTICAL LENS

(71) Applicant: Rays Optics Inc., Hsinchu County (TW)

(72) Inventors: Sheng-Tang Lai, Hsinchu County (TW); Kuo-Chuan Wang, Hsinchu County (TW); Yuan-Hung Su, Taichung (TW)

(73) Assignee: RAYS OPTICS INC., Hukou Township (TW)

( * ) Notice: Subject to any disclaimer, the term of this patent is extended or adjusted under 35 U.S.C. 154(b) by 252 days.

(21) Appl. No.: 16/228,155

(22) Filed: Dec. 20, 2018

(65) Prior Publication Data

US 2019/0204542 A1     Jul. 4, 2019

(30) Foreign Application Priority Data

Dec. 29, 2017   (TW) ................. 106146526

(51) Int. Cl.
*G02B 13/00*   (2006.01)
*G02B 9/60*    (2006.01)

(52) U.S. Cl.
CPC ............ *G02B 13/008* (2013.01); *G02B 9/60* (2013.01); *G02B 13/0045* (2013.01)

(58) Field of Classification Search
CPC .. G02B 13/00; G02B 13/008; G02B 13/0045; G02B 13/005; G02B 13/18; G02B 9/60; G02B 9/62; G02B 9/64; G02B 5/00; G02B 5/005; G02B 5/208; G02B 27/00; G02B 27/0025; G02B 3/04; G02B 1/04; G02B 1/041; B60R 1/00; B60R 2300/10

USPC ........ 359/357, 356, 708, 713, 714, 763, 770
See application file for complete search history.

(56) References Cited

U.S. PATENT DOCUMENTS

| | | | |
|---|---|---|---|
| 8,699,150 B1* | 4/2014 | Hsieh ................ | G02B 13/0045 359/714 |
| 9,274,313 B2 | 3/2016 | Mori et al. | |
| 9,703,076 B2* | 7/2017 | Liu .................... | G02B 13/0045 |
| 2015/0002942 A1* | 1/2015 | Chen ................. | G02B 13/0045 359/664 |
| 2017/0184812 A1 | 6/2017 | Yoon et al. | |

FOREIGN PATENT DOCUMENTS

| | | |
|---|---|---|
| CN | 101051110 A | 10/2017 |
| TW | 201441651 A | 11/2014 |
| TW | 201544841 A | 12/2015 |
| TW | 201701009 A | 1/2017 |

* cited by examiner

*Primary Examiner* — Jie Lei
(74) *Attorney, Agent, or Firm* — Muncy, Geissler, Olds & Lowe, P.C.

(57) ABSTRACT

An optical lens includes a first lens, a second lens, a third lens, a fourth lens and a fifth lens arranged in order from a magnified side to a minified side. A sum of refractive powers of the first lens and the second lens is negative, and a sum of refractive powers of the third lens, the fourth lens and the fifth lens is positive. The first lens is a glass lens with a negative refractive power, the second lens is a plastic lens, and the third lens, the fourth lens and the fifth lens are composed of one glass lens with an Abbe number of larger than 60 and two plastic lenses.

20 Claims, 9 Drawing Sheets

OPTICAL LENS

BACKGROUND OF THE INVENTION a. Field of the Invention

The invention relates to an optical lens.

b. Description of the Related Art

With the advances in optical-electronic technologies, image-sensing devices (such as digital video cameras and digital cameras) have been widely used in daily life and various industries. An optical lens that can form clear images on a screen or a charge coupled device (CCD) is a key component for an image-sensing device. Nowadays, as smart home surveillance cameras and advanced driver assistance systems (ADAS) become more immersed in user's everyday lives, there is a growing need for these devices to become thinner and have high optical performance. To meet these requirements, an optical lens needs to have wide viewing angles, low fabrication costs, large aperture, light weight and 24-hours confocal image-capturing capability. Therefore, it is desirable to provide an optical lens that may achieve low-profile and compact designs, wide viewing angles, low fabrication costs, reduced distortion, high resolution, good imaging quality and 24-hours confocal image-capturing capability.

However, in order to offer the 24-hours confocal capability, a typical optical lens needs a considerable number of lenses or needs a switch mechanism for an optical filter. This may additionally increase fabrication costs. Further, in a typical lens design, plastic lenses that are often used to reduce fabrication costs are liable to cause the effects of thermal drift to lower optical performance. Accordingly, it is desirable to provide an optical lens that may cure the above deficiencies and provide high optical performance.

BRIEF SUMMARY OF THE INVENTION

According to one aspect of the present disclosure, an optical lens includes a first lens, a second lens, a third lens, a fourth lens and a fifth lens arranged in order from a magnified side to a minified side. A sum of refractive powers of the first lens and the second lens is negative, and a sum of refractive powers of the third lens, the fourth lens and the fifth lens is positive. The first lens is a glass lens with a negative refractive power, the second lens is a plastic lens, and the third lens, the fourth lens and the fifth lens are composed of one glass lens with an Abbe number of larger than 60 and two plastic lenses.

According to another aspect of the present disclosure, an optical lens includes a first lens group with a negative refractive power, a second lens group with a positive refractive power, and an aperture stop disposed between the first lens group and the second lens group. The first lens group includes a first lens closest to a magnified side and a second lens, the first lens is a glass lens, and the second lens is a plastic lens. The second lens group includes a third lens, a fourth lens and a fifth lens composed of one glass lens and two plastic lenses. The optical lens satisfies the conditions: SD1/R1<0.45 and 0.5<R1/TTL<1, where SD1 is a radius of a magnified-side surface of the first lens, R1 is a radius of curvature of the magnified-side surface of the first lens, and TTL is a total track length of the optical lens.

According to the above embodiments, the optical lens may achieve low-profile and compact designs, wide viewing angles, high resolution, large aperture, reduced distortion, low fabrication costs, low thermal drift, good imaging quality and 24-hours confocal image-capturing capability.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. Further, "First," "Second," etc, as used herein, are used as labels for nouns that they precede, and do not imply any type of ordering (e.g., spatial, temporal, logical, etc.).

The term "optical element" refers to an element made from at least in part a material that may refract, reflect, diffract, diffuse or filter at least a portion of the light passing through it. The material may include plastic or glass, and the optical element may be, for example, a lens, a prism or an aperture stop.

In an image-pickup system, a magnified side may refer to one side of an optical path of an optical lens comparatively near a subject to be picked-up, and a minified side may refer to other side of the optical path comparatively near a photosensor.

A certain region of an object side surface (or an image side surface) of a lens may be convex or concave. Herein, a convex or concave region is more outwardly convex or inwardly concave in the direction of an optical axis as compared with other neighboring regions of the object/image side surface.

Figure 1:
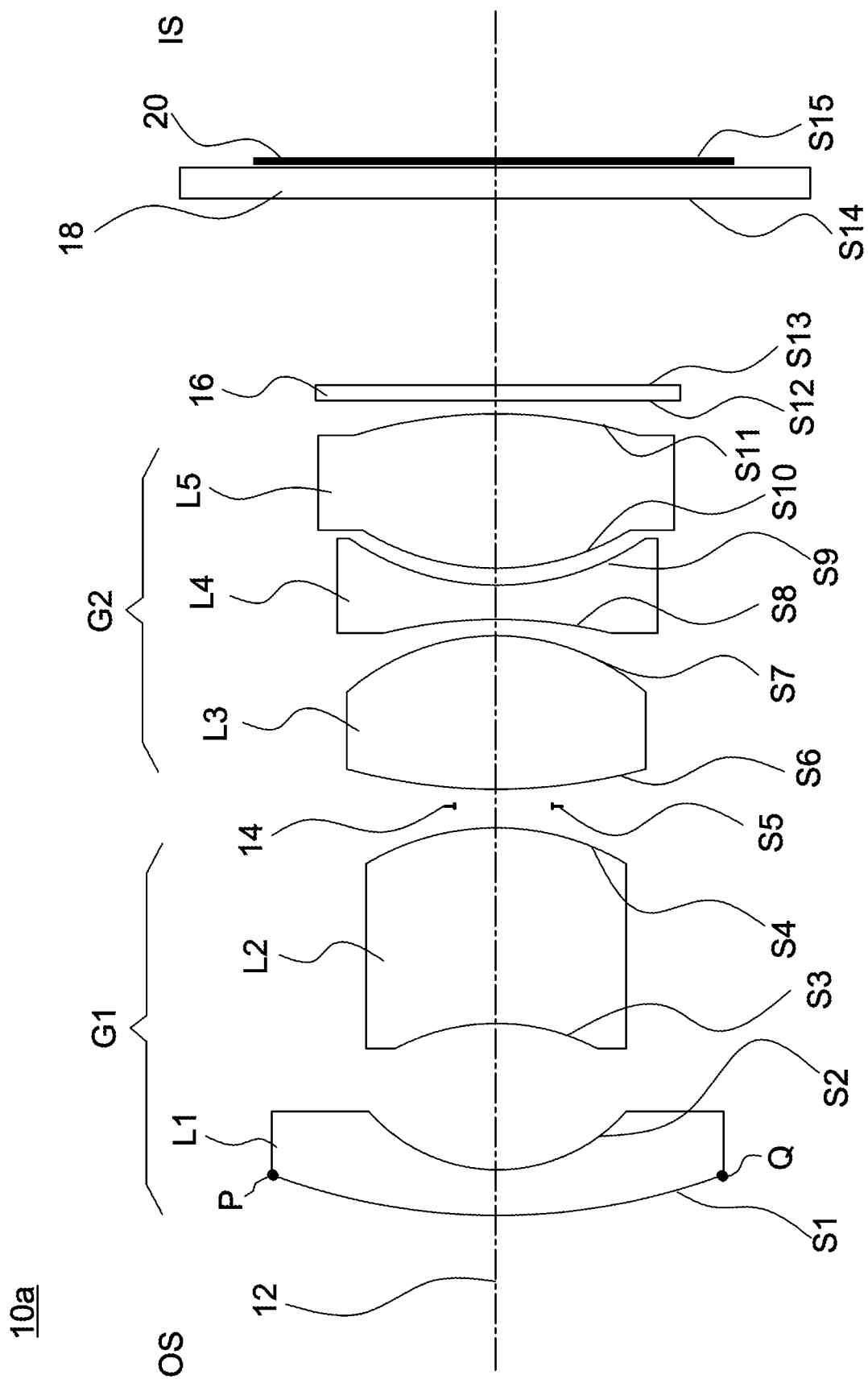
FIG. 1 shows a cross-sectional illustration of an optical lens according to an embodiment of the invention.

FIG. 1 shows a cross-sectional illustration of an optical lens according to an embodiment of the invention. As shown in FIG. 1, in this embodiment, the optical lens 10a has a lens barrel (not shown), and inside the lens barrel a first lens group G1 and a second lens group G2 are arranged in order from a first side (magnified side OS) to a second side (minified side IS). The first lens group G1 is located between the magnified side OS and the minified side IS. The second lens group G2 is located between the first lens group G1 and the minified side IS. The first lens group G1 and the second lens group G2 are arranged along an optical axis 12 of the optical lens 10a.

In this embodiment, the optical lens 10a includes five lenses with refractive powers, and a first lens L1 closest to the magnified side OS is a glass lens to provide water and scratch resistance and thus is favorable to vehicle or surveillance cameras. Further, a second lens L2 is a plastic lens. Besides, the first lens group G1 has a negative refractive power, and the second lens group G2 has a positive refractive power. Further, in this embodiment, the optical lens 10a includes three plastic lenses and does not have any cemented lens. The second lens group G2 may include a glass lens with an Abbe number of greater than 60 and two plastic lenses to offer competent 24-hours confocal image-capturing capability. In other embodiment, the glass lens of the second lens group G2 may have an Abbe number of greater than 70, and more preferably greater than 80 to further enhance the confocal image-capturing capability. Under the circumstance, the optical lens is finely corrected for chromatic aberrations over a wavelength region of 435 to 850 nm and may achieve high optical performance. Besides, a focal point for infrared light (850 nm) may substantially coincide with a focal point for visible light (555 nm); that is, a displacement between the two focal points is less than 10 µm.

In this embodiment, the first lens group G1 includes a first lens L1 and a second lens L2 arranged in order from a magnified side (object side) OS to a minified side (image side) IS. The second lens group G2 includes a third lens L3, a fourth lens L4 and a fifth lens L5 arranged in order from the magnified side OS to the minified side IS. The second lens L2, fourth lens L4 and fifth lens L5 are aspheric lenses. In this embodiment, the refractive powers of the first lens L1 to the fifth lens L5 are negative, positive, positive, negative and positive, respectively. Further, a sum of refractive powers of the first lens L1 and the second lens L2 is negative, and a sum of refractive powers of the third lens L3, the fourth lens L4 and the fifth lens L5 is positive. Each of the lenses L1-L5 has a clear aperture (CA). Herein, the term "clear aperture" is known to the person skilled in the art and may refer to a diameter of a len's maximum circular area through which light transmits.

In this embodiment, the first lens L1 is a negative meniscus lens having a magnified-side convex surface, the second lens L2 is a positive meniscus lens having a magnified-side concave surface, the third lens is a biconvex lens, the fourth lens L4 is a negative meniscus lens having a magnified-side convex surface, and the fifth lens L5 is a biconvex lens.

In this embodiment, the lens 10a further includes an aperture stop 14, an IR filter 16 and a cover glass 18. The aperture stop 14 is disposed between the second lens L2 of the first lens group G1 and the third lens L3 of the second lens group G2. The IR filter 16 is disposed between the fifth lens L5 of the second lens group G2 and the minified side IS. The cover glass 18 is disposed between the IR filter 16 and the minified side IS to protect the photosensor (not shown).

The aperture stop may be an independent component or integrally formed with other optical element. In this embodiment, the aperture stop may use a mechanic piece to block out peripheral light and transmit central light to achieve aperture effects. The mechanic piece may be adjusted by varying its position, shape or transmittance. In other embodiment, the aperture stop may be formed by applying an opaque or a light-absorbing material on a lens surface except for a central area to block out peripheral light and transmits central light.

Detailed optical data and design parameters of the optical lens 10a are shown in Table 1 below. Note the data provided below are not used for limiting the invention, and those skilled in the art may suitably modify parameters or settings of the following embodiment with reference of the invention without departing from the scope or spirit of the invention. For example, in one embodiment, the optical lens may have at most seven lenses with refractive powers.

TABLE 1

| surface | radius of curvature (mm) | interval (mm) | refractive index | Abbe number | object description |
|---|---|---|---|---|---|
| S1 | 7.63 | 0.50 | 1.89 | 40.8 | L1 |
| S2 | 2.00 | 1.59 | | | |
| S3 | −3.06 | 2.21 | 1.67 | 20.4 | L2 |
| S4 | −2.41 | 0.12 | | | |
| S5 | INF | 0.35 | | | Stop |
| S6 | 8.23 | 1.68 | 1.50 | 81.5 | L3 |
| S7 | −2.49 | 0.10 | | | |
| S8 | 6.51 | 0.50 | 1.68 | 20.4 | L4 |
| S9 | 1.36 | 0.16 | | | |
| S10 | 2.01 | 1.76 | 1.53 | 55.4 | L5 |
| S11 | −4.61 | 0.10 | | | |
| S12 | INF | 0.21 | 1.52 | 64.1 | IR filter |
| S13 | INF | 2.28 | | | |
| S14 | INF | 0.45 | | | Cover glass |
| S15 | INF | | | | Image plane |

In the above Table 1, the field heading "interval" represents a distance between two adjacent surfaces along the optical axis 12 of the optical lens 10a. For example, an interval of the surface S1 is a distance between the surface S1 and the surface S2 along the optical axis 12. Further, the interval, refractive index and Abbe number of any lens listed in the column of "Object description" show values in a horizontal row aligned with the position of that lens. Moreover, in table 1, the surfaces S1 and S2 are two lens surfaces of the first lens L1, the surfaces S3 and S4 are two lens surfaces of the second lens L2, and the remaining lens surfaces are classified by analogy so that related descriptions are omitted for sake of brevity. The aperture stop 14 is designated by the surface S5, and the surfaces S12 and S13 are two surfaces of the IR filter 16. The surface 14 is a surface of the cover glass 18 facing the magnified side OS, and the image plane of the optical lens 10a is designated by the surface S15.

In the following design example, the surfaces S3, S4, S8, S9, S10 and S11 are aspheric surface that satisfy the following equation:

$$Z = \frac{cr^2}{1 + \sqrt{1 - (1+k)c^2 r^2}} + \sum_{i=1}^{N} \alpha_i r^i, \quad (1)$$

where Z denotes a sag of an aspheric surface along the optical axis 12, c denotes a reciprocal of a radius of an osculating sphere (such as radii of curvature of surfaces S1-S11 listed in Table 1), k denotes a Conic constant, r denotes a height of the aspheric surface, and $\alpha_i$ denotes aspheric coefficients of each order. Table 2 lists aspheric coefficients and conic constants of aspheric surfaces S3, S4, S8, S9, S10 and S11 of the optical lens 10a.

TABLE 2

| | S3 | S4 | S8 | S9 | S10 | S11 |
|---|---|---|---|---|---|---|
| k | 1.623 | 1.643 | 14.975 | −1.179 | −0.637 | −1.521 |
| α1 | 0 | 0 | 0 | 0 | 0 | 0 |
| α2 | 0 | 0 | 0 | 0 | 0 | 0 |

TABLE 2-continued

| | S3 | S4 | S8 | S9 | S10 | S11 |
|---|---|---|---|---|---|---|
| α3 | −0.0279 | 0.0286 | −0.0232 | −0.0221 | −0.0167 | 0.0167 |
| α4 | 0.0710 | −0.0747 | −0.0449 | −0.1293 | −0.0517 | −0.0364 |
| α5 | −0.1136 | 0.1437 | −0.0325 | 0.0052 | −0.0097 | 0.0220 |
| α6 | 0.0514 | −0.0422 | 0.0396 | 0.0953 | 0.0350 | 0.0066 |
| α7 | 0.0252 | −0.0521 | 0.0078 | 0.0003 | 0.0016 | −0.0027 |
| α8 | −0.0154 | 0.0100 | −0.0149 | −0.0523 | −0.0056 | −0.0084 |
| α9 | −0.0105 | 0.0244 | −0.0026 | 0.0001 | −0.0007 | 0.0003 |
| α10 | 0.0049 | 0.0109 | 0.0006 | 0.0170 | −0.0030 | 0.0044 |
| α11 | 0.0013 | −0.0016 | 0.0003 | −0.0001 | 0.0002 | 0.0001 |
| α12 | −0.0008 | −0.0086 | 0.0013 | −0.0031 | 0.0015 | −0.0010 |
| α13 | 0.0015 | −0.0066 | 0.0002 | 0.0000 | 0.0000 | 0.0000 |
| α14 | −0.0008 | 0.0058 | −0.0004 | 0.0002 | −0.0002 | 0.0001 |

In this embodiment, the optical lens 10a has a total track length TTL of 12 mm, an effective focal length EFL of 1.84 mm, an F-Number of 2.05, a full field view (measured diagonally) of 155.4 degrees, and an image circle of 4.4 mm. In this embodiment, a radius SD1 of the magnified-side surface S1 of the first lens L1 is 2.49 mm. The radius SD1 equals half of a distance measured perpendicular to the optical axis 12 and between two opposite turning points P and Q of the surface S1, as shown in FIG. 1. In this embodiment, the optical lens 10a satisfies the conditions of SD1/R1<0.45 and 0.5<R1/TTL<1, where SD1 is a radius of a magnified-side surface (surface S1) of the first lens L1, R1 is a radius of curvature of the magnified-side surface (surface S1) of the first lens L1, and TTL is a total track length of the optical lens. In this embodiment, each aspheric lens may be made from plastic. In other embodiments, each aspheric lens may be made from glass molding.

The radius of curvature is a reciprocal of the curvature. When the curvature is positive, the center of a lens surface is located towards the minified side. When the curvature is negative, the center of a lens surface is located towards the magnified side. The concavity and convexity of each lens surface is listed in the above table and shown in corresponding figures.

The Symbol F/# described above is an aperture value of the aperture stop. The Symbol EFL described above is an effective focal length of the optical lens 10a.

When the optical lens is used in an optical projection system, an image circle refers to a maximum effective area of a light valve for emitting image beams. In comparison, when the optical lens is used in an image pick-up system, the image circle described above refers to a diagonal length of an image on an image plane.

A total track length of the optical lens 10a is denoted as "TTL" as described above. Specifically, the total track length TTL of the optical lens 10a is a distance along the optical axis 12 between a lens surface S1 closest to the magnified side and the image plane S15.

In this embodiment, when the optical lens is used in an optical projection system, the FOV described above is an angle made between an optical surface nearest the magnified side and the optical axis of the optical lens, i.e., a full field of view measured diagonally.

Figure 2:
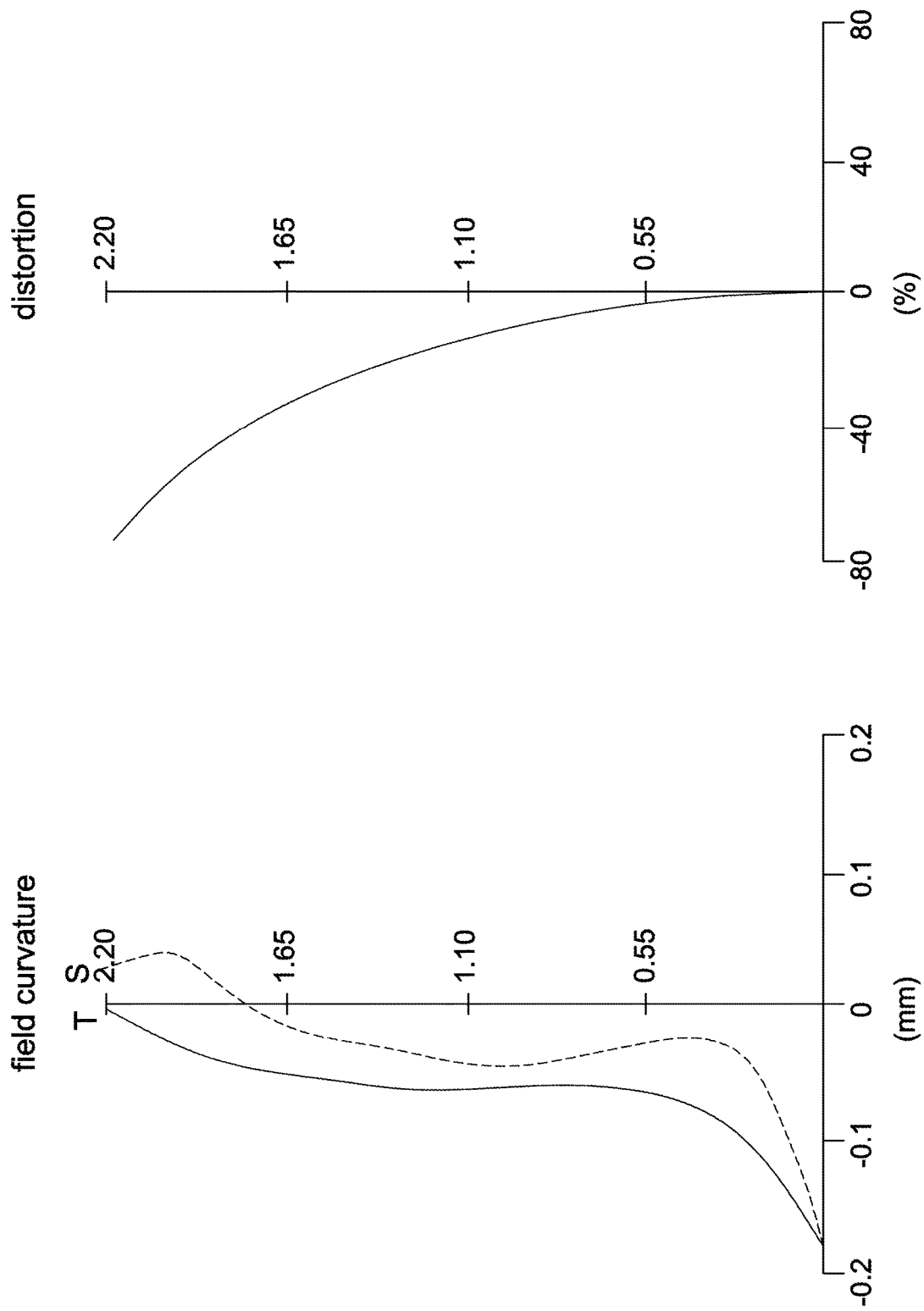
FIGS. 2-4 show optical simulation results of the optical lens shown in FIG. 1.
Figure 3:
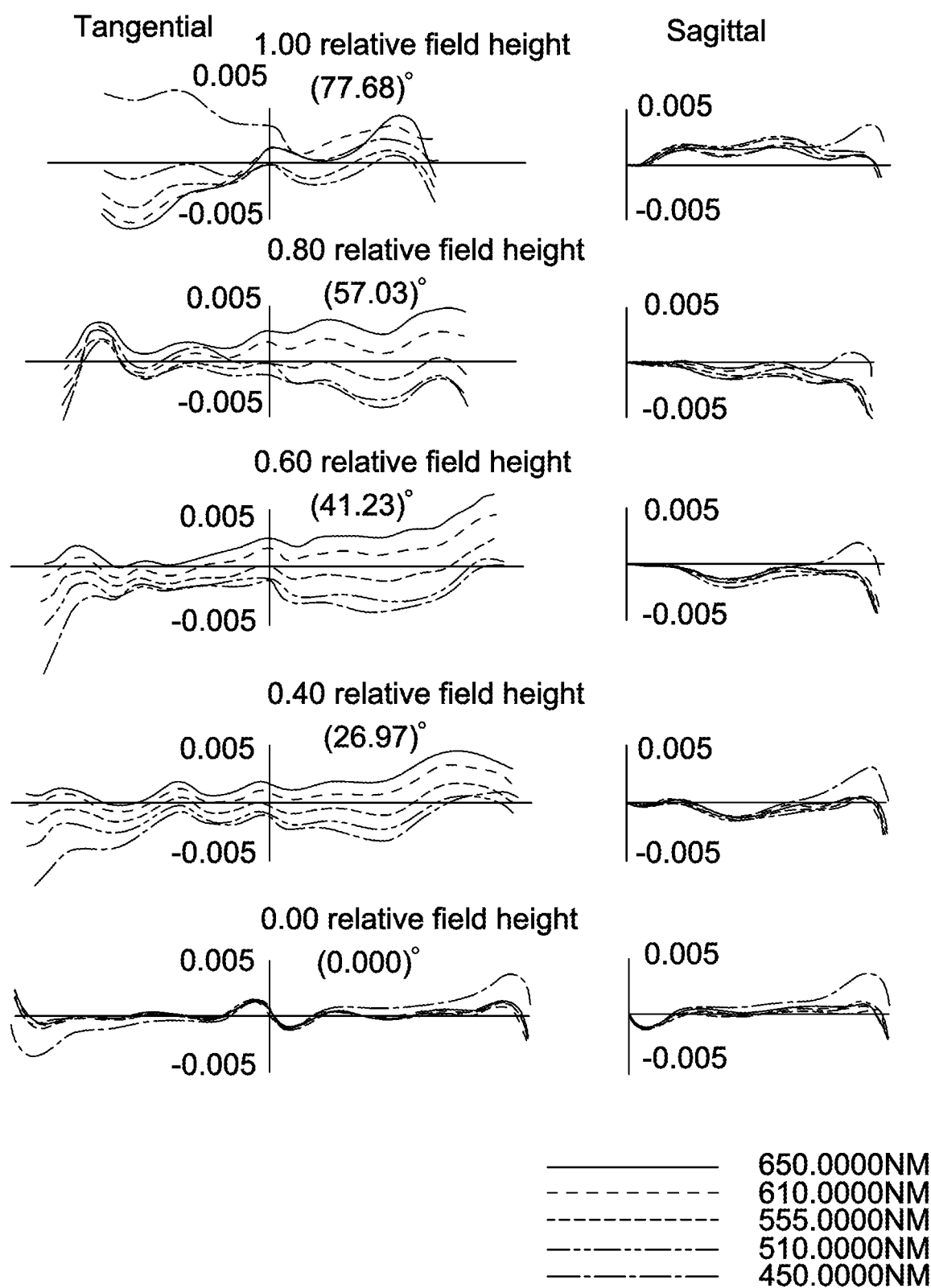
Figure 4:
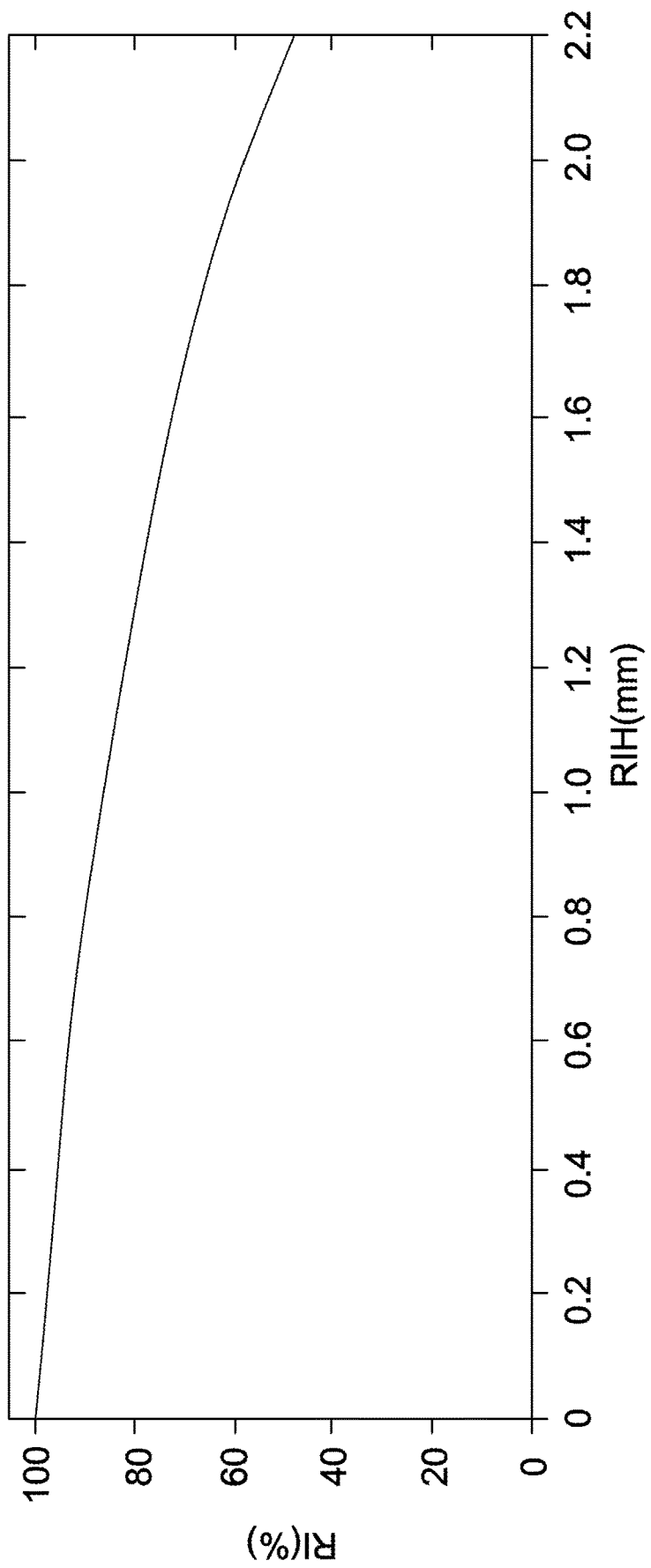

FIGS. 2-4 show optical simulation results of the optical lens 10a shown in FIG. 1. FIG. 2 illustrates astigmatic field curves and percentage distortion curves. In the astigmatic field curves, the abscissa represents a distance relative to a focal plane, and the ordinate represents the magnitude of the field (from 0 to the maximum field). In the percentage distortion curves, the abscissa represents the percentage of distortion, and the ordinate represents the magnitude of the field (from 0 to the maximum field). FIG. 3 shows lateral ray fan plots, where the abscissa of each ray fan plot represents entrance pupil positions of the aperture stop 14, and the ordinate of each plot represents relative numerical values of positions on an image plane (such as the image plane 20) where main light beams are projected. FIG. 4 illustrates relative illumination of the optical lens 10a. The simulated results shown in FIGS. 2-4 are within permitted ranges specified by the standard, which indicates the optical lens 10a may achieve good imaging quality and luminous uniformity.

In this embodiment, a displacement between a focal point for 850 nm and a focal point for 555 nm of the optical lens 10a is 9 μm. That is, the 555 nm visible light may pass an optical lens to form a first focal plane, the first focal plane may cross an optical axis of the optical lens to form a first intersection (focal point), the 850 nm infrared light may pass the optical lens to form a second focal plane, and the second focal plane may cross the optical axis of the optical lens to form a second intersection (focal point). A displacement between the first intersection and the second intersection is smaller than 10 μm. Therefore, this may achieve good imaging quality and 24-hours confocal capability without the need of a considerable number of lenses, cemented glass optics, or an IR filter switching mechanism. Note the 555 nm visible light may be replaced with other wavelength of visible light to check whether the confocal capability and good imaging quality are well achieved during a 24-hour period.

In this embodiment, a displacement between a focal point of the optical lens 10a measured at 25° C. and a focal point of the optical lens 10a measured at −40° C. is 7 μm, and a focal point of the optical lens 10a measured at 25° C. and a focal point of the optical lens measured at 85° C. is 9 μm. Therefore, the optical lens 10a may achieve low thermal shift and good imaging quality in the temperature range of −40° C. to 85° C. Beside, in this embodiment, the optical lens 10a may satisfy at least one of the following conditions: (1) the total track length is smaller than 20 mm; (2) the full field of view is greater than 120 degrees; (3) the F-number is larger than 1.8.

Figure 5:
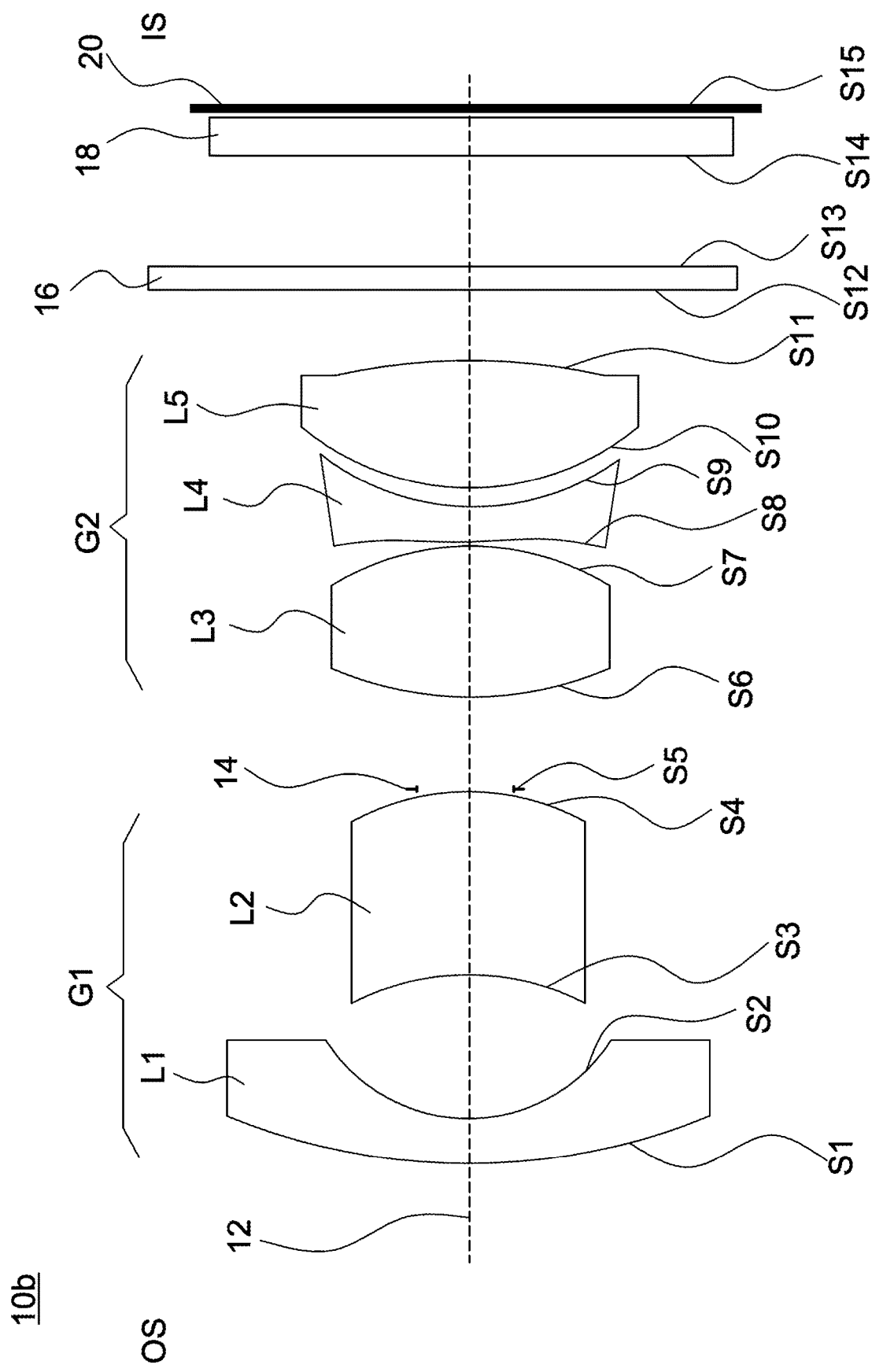
FIG. 5 shows a cross-sectional illustration of an optical lens according to another embodiment of the invention.
Figure 6:
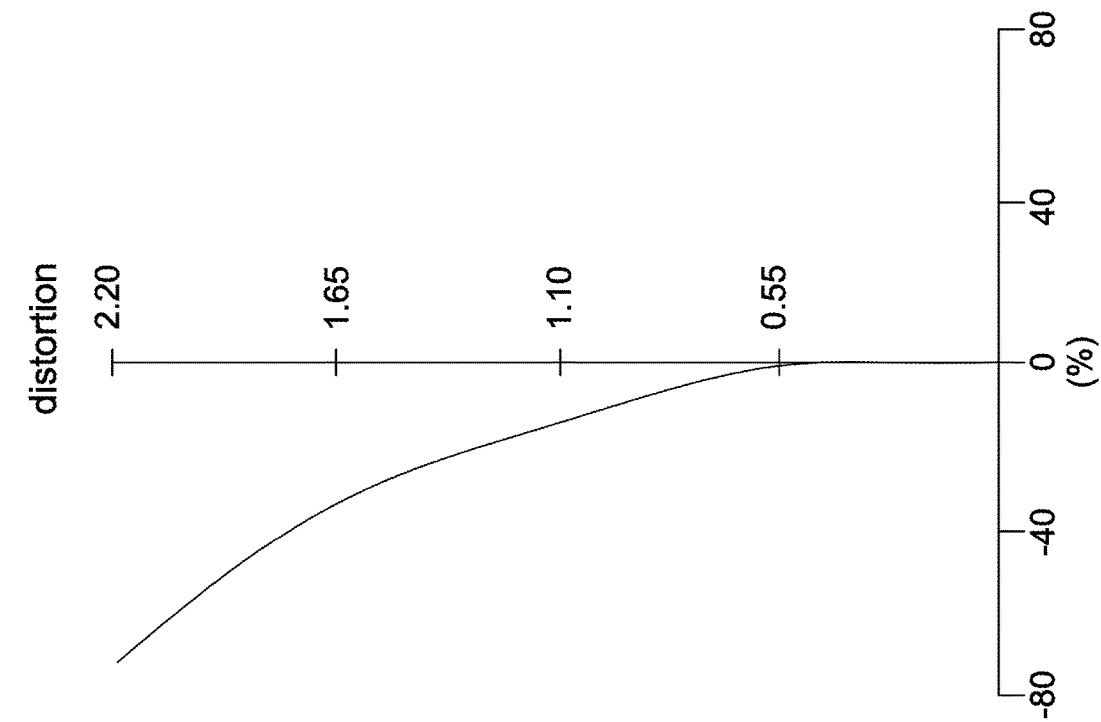
FIGS. 6-8 show optical simulation results of the optical lens shown in FIG. 5.
Figure 6:
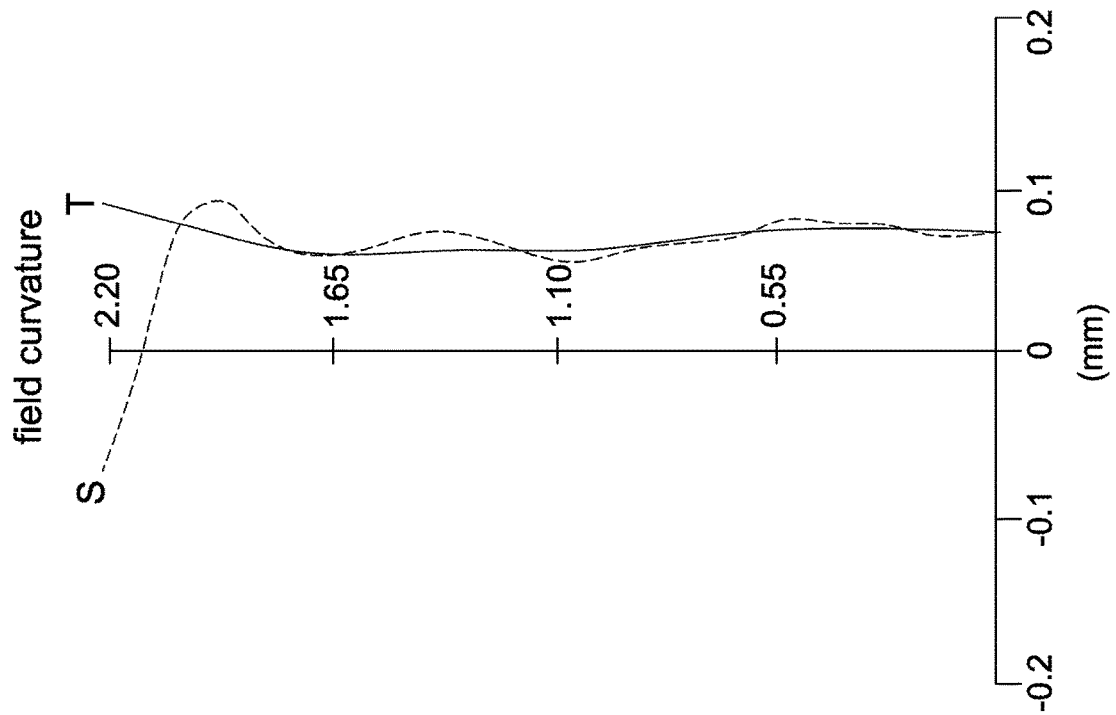
Figure 7:
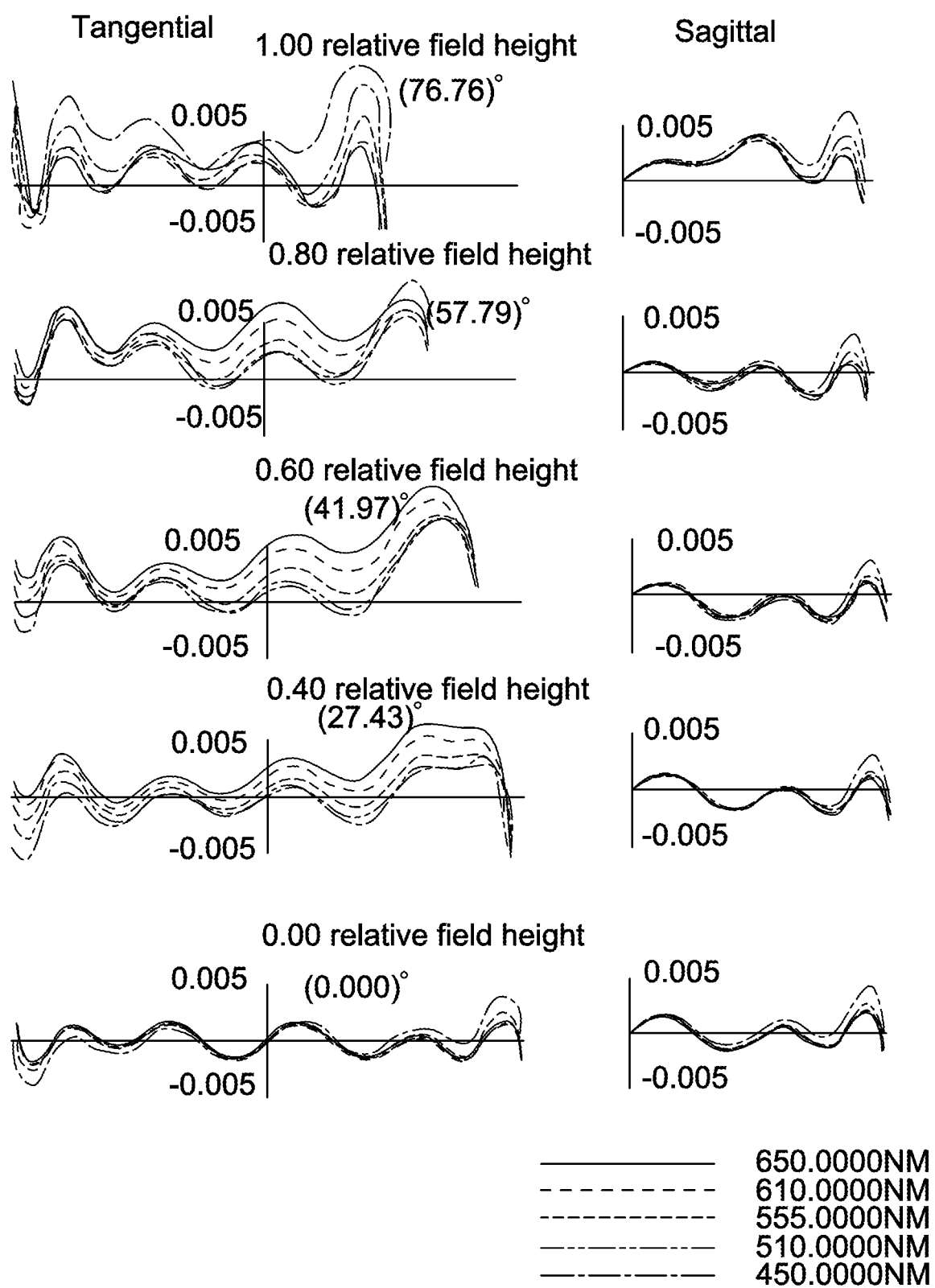
Figure 8:
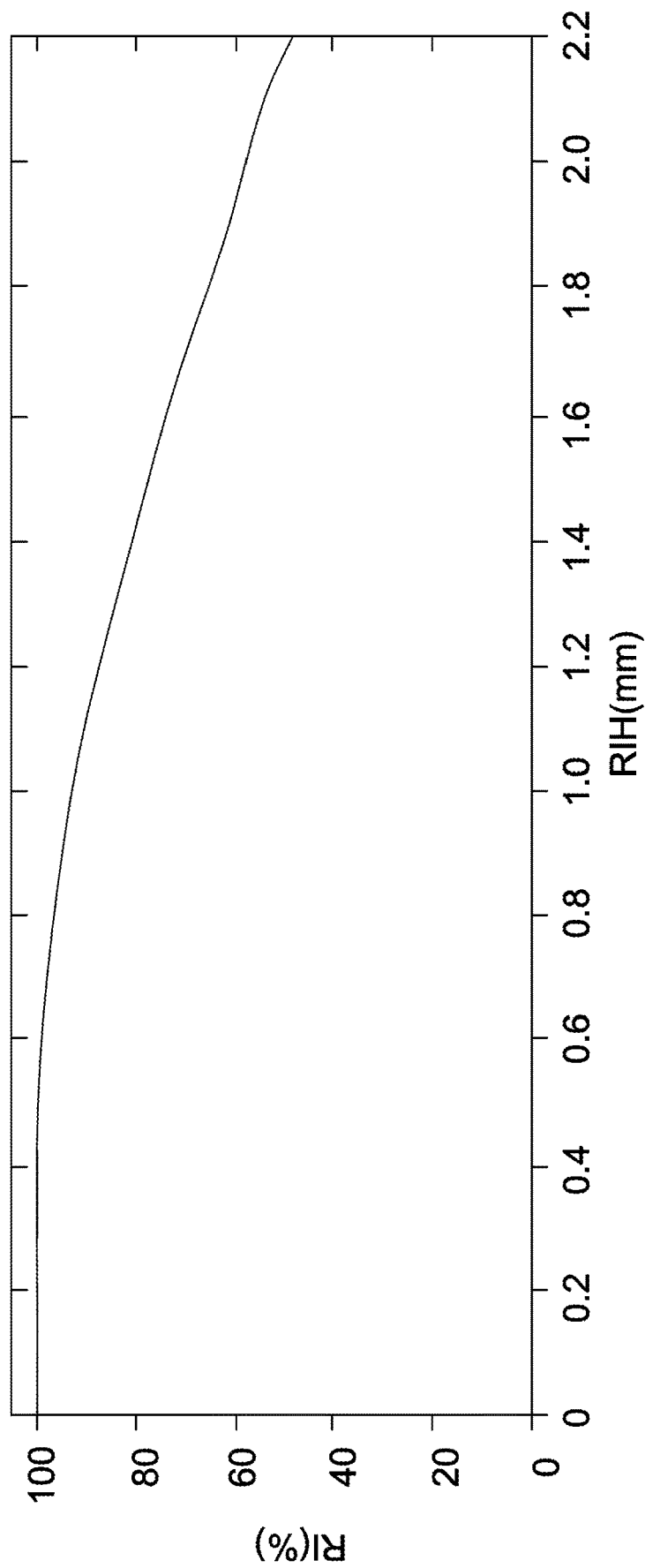

FIG. 5 shows a cross-sectional illustration of an optical lens according to another embodiment of the invention. FIGS. 6-8 show optical simulation results of the optical lens 10b shown in FIG. 5. FIG. 6 illustrates astigmatic field curves and percentage distortion curves. FIG. 7 shows lateral ray fan plots, and FIG. 8 illustrates relative illumination of the optical lens 10b. The optical lens 10b shown in FIG. 5 is similar to the optical lens 10a shown in FIG. 1, except for the different design parameters of respective lenses.

Detailed optical data and design parameters of the optical lens 10b are shown in Table 3 below.

TABLE 3

| surface | radius of curvature (mm) | interval (mm) | refractive index | Abbe number | object description |
|---|---|---|---|---|---|
| S1 | 7.70 | 0.50 | 1.84 | 42.7 | L1 |
| S2 | 2.00 | 1.64 | | | |
| S3 | −2.92 | 2.07 | 1.67 | 20.4 | L2 |
| S4 | −2.72 | 0.15 | | | |
| S5 | INF | 1.26 | | | Stop |
| S6 | 3.94 | 1.76 | 1.50 | 81.5 | L3 |
| S7 | −2.74 | 0.03 | | | |
| S8 | 7.08 | 0.38 | 1.68 | 20.4 | L4 |
| S9 | 1.59 | 0.23 | | | |
| S10 | 2.09 | 1.48 | 1.53 | 55.4 | L5 |
| S11 | −13.55 | 0.84 | | | |

TABLE 3-continued

| surface | radius of curvature (mm) | interval (mm) | refractive index | Abbe number | object description |
|---|---|---|---|---|---|
| S12 | INF | 0.21 | 1.52 | 64.1 | IR filter |
| S13 | INF | 1.31 | | | |
| S14 | INF | 0.45 | | | Cover glass |
| S15 | INF | | | | Image plane |

Note the meaning of each field heading and the way to look each numerical value up in the Table 3 are similar to those of Table 1, and thus related descriptions are omitted for sake of brevity. In this embodiment, a radius SD1 of the magnified-side surface S1 is 2.78 mm, and the optical lens 10b satisfies the conditions of SD1/R1<0.45 and 0.5<R1/TTL<1, where SD1 is a radius of a magnified-side surface (surface S1) of the first lens L1, R1 is a radius of curvature of the magnified-side surface (surface S1) of the first lens L1, and TTL is a total track length of the optical lens 10b.

In this embodiment, the surfaces S3, S4, S8, S9, S10 and S11 are aspheric surface that satisfy the above equation (1). Table 4 lists aspheric coefficients and conic constants of aspheric surfaces S3, S4, S8, S9, S10 and S11 of the optical lens 10b

TABLE 4

| | S3 | S4 | S8 | S9 | S10 | S11 |
|---|---|---|---|---|---|---|
| k | 1.010 | 2.846 | 15.579 | −1.139 | −1.409 | 19.948 |
| $\alpha 1$ | 0 | 0 | 0 | 0 | 0 | 0 |
| $\alpha 2$ | 0 | 0 | 0 | 0 | 0 | 0 |
| $\alpha 3$ | 0.0000 | 0.0000 | 0.0000 | 0.0000 | 0.0000 | 0.0000 |
| $\alpha 4$ | −0.0021 | −0.0095 | −0.0566 | −0.0836 | −0.0459 | −0.0056 |
| $\alpha 5$ | 0.0000 | 0.0000 | 0.0000 | 0.0000 | 0.0000 | 0.0000 |
| $\alpha 6$ | −0.0081 | 0.1643 | 0.0146 | 0.0416 | 0.0151 | −0.0091 |
| $\alpha 7$ | 0.0000 | 0.0000 | 0.0000 | 0.0000 | 0.0000 | 0.0000 |
| $\alpha 8$ | 0.0172 | −0.3476 | −0.0059 | −0.0121 | −0.0009 | 0.0103 |
| $\alpha 9$ | 0.0000 | 0.0000 | 0.0000 | 0.0000 | 0.0000 | 0.0000 |
| $\alpha 10$ | −0.0116 | 0.4049 | 0.0002 | 0.0012 | −0.0001 | −0.0054 |
| $\alpha 11$ | 0.0000 | 0.0000 | 0.0000 | 0.0000 | 0.0000 | 0.0000 |
| $\alpha 12$ | 0.0037 | −0.2326 | 0.0000 | 0.0000 | 0.0000 | 0.0015 |
| $\alpha 13$ | 0.0000 | 0.0000 | 0.0000 | 0.0000 | 0.0000 | 0.0000 |
| $\alpha 14$ | −0.0004 | 0.0532 | 0.0000 | 0.0000 | 0.0000 | −0.0002 |

In this embodiment, the optical lens 10b has a total track length TTL of 12 mm, an effective focal length EFL of 1.875 mm, an F-Number of 2.05, and a full field view (measured diagonally) of 153.5 degrees. In this embodiment, a displacement between a focal point for 850 nm and a focal point for 555 nm of the optical lens 10b is 6 μm. Therefore, this may achieve good imaging quality and 24-hours confocal capability without the need of a considerable number of lenses, cemented glass optics, or an IR filter switching mechanism. In this embodiment, a displacement between a focal point of the optical lens 10b measured at 25° C. and a focal point of the optical lens measured at −40° C. is 2 μm, and a focal point of the optical lens 10b measured at 25° C. and a focal point of the optical lens measured at 85° C. is 2 μm. Therefore, the optical lens 10b may achieve low thermal shift and good imaging quality in the temperature range of −40° C. to 85° C. Beside, in this embodiment, the optical lens 10b may satisfy at least one of the following conditions: (1) the total track length is smaller than 20 mm; (2) the full field of view is greater than 120 degrees; (3) the F-number is larger than 1.8.

Figure 9:
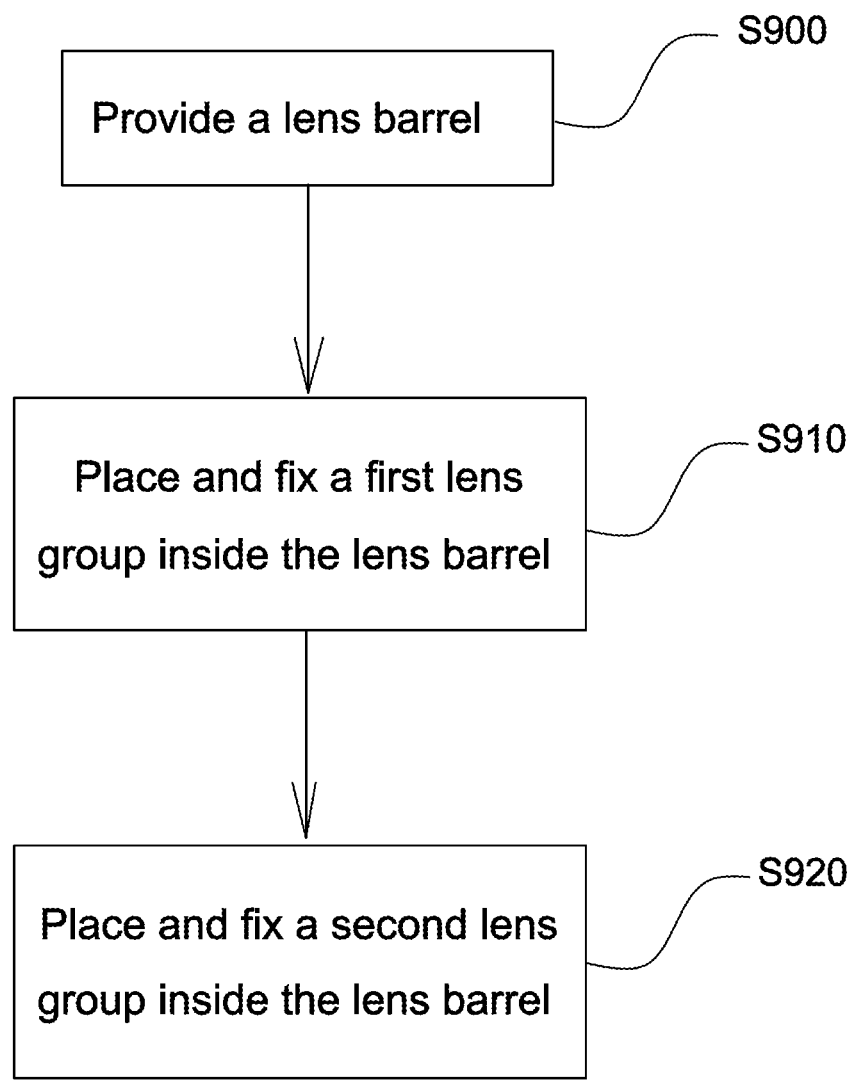
FIG. 9 shows a schematic diagram illustrating a fabrication method of an optical lens according to an embodiment of the invention.

FIG. 9 shows a schematic diagram illustrating a fabrication method of an optical lens according to an embodiment of the invention. As shown in FIG. 9, the fabrication method may be applied to the optical lenses 10a and 10b. The following example is described with reference to the optical lens 10a of FIG. 1, but the invention is not limited thereto. In this embodiment, the fabrication method for the optical lens 10a may include the steps of providing a lens barrel (Step S900), placing and fixing a first lens group 20 inside the lens barrel (Step S910), and placing and fixing a second lens group 30 inside the lens barrel (Step S920). The order of the above steps is not restricted and may vary according to actual demands.

According to the above embodiments, the optical lens may achieve low-profile and compact designs, wide viewing angles, high resolution, large aperture, reduced distortion, low fabrication costs, low thermal drift, good imaging quality and 24-hours confocal image-capturing capability.

Though the embodiments of the invention and design parameters in the tables have been presented for purposes of illustration and description, they are not intended to be exhaustive or to limit the invention. Accordingly, many modifications and variations without departing from the spirit of the invention or essential characteristics thereof will be apparent to practitioners skilled in this art. For example, the number of all lenses of each lens group or optical parameters such as refractive power for each lens may be changed, or a lens without affecting the overall optical performance may be additionally provided. It is intended that the scope of the invention be defined by the claims appended hereto and their equivalents in which all terms are meant in their broadest reasonable sense unless otherwise indicated.

What is claimed is:

1. An optical lens, comprising:
a first lens, a second lens, a third lens, a fourth lens and a fifth lens arranged in order from a magnified side to a minified side, a sum of refractive powers of the first lens and the second lens being negative, a sum of refractive powers of the third lens, the fourth lens and the fifth lens being positive, the first lens being a glass lens with a negative refractive power, the second lens being a plastic lens, the third lens, the fourth lens and the fifth lens being composed of one glass lens and two plastic lenses, and a full field of view of the optical lens being greater than 120 degrees, wherein the second lens has a magnified-side concave surface and a minified-side convex surface, the fifth lens has a magnified-side convex surface and a minified-side convex surface, and the minified-side convex surface of the fifth lens is not provided with any inflection point.

2. The optical lens as claimed in claim 1, wherein a total track length of the optical lens is smaller than 20 mm.

3. The optical lens as claimed in claim 1, wherein a displacement between a focal point of the optical lens measured at 85° C. and a focal point of the optical lens measured at −40° C. is less than 10 μm.

4. The optical lens as claimed in claim 1, wherein an F-number of the optical lens is larger than 1.8.

5. The optical lens as claimed in claim 1, wherein 555 nm visible light passes the optical lens to form a first focal plane, the first focal plane crosses an optical axis of the optical lens to form a first intersection, 850 nm infrared light passes the optical lens to form a second focal plane, the second focal plane crosses the optical axis of the optical lens to form a second intersection, and a displacement between the first intersection and the second intersection is smaller than 10 μm.

6. The optical lens as claimed in claim 1, wherein respective refractive powers of the first lens to the fifth lens are negative, positive, positive, negative and positive.

7. The optical lens as claimed in claim 1, wherein the second lens, the fourth lens and the fifth lens are aspheric lenses.

8. The optical lens as claimed in claim 1, wherein the optical lens has three plastic lenses and does not have any cemented lens.

9. The optical lens as claimed in claim 1, wherein respective shapes of the first lens to the fifth lens are meniscus, meniscus, biconvex, meniscus and biconvex.

10. The optical lens as claimed in claim 1, wherein a total number of lenses in the optical lens is no more than seven.

11. The optical lens as claimed in claim 1 wherein the glass lens being one of the third lens, the fourth lens and the fifth lens has an Abbe number of larger than 60.

12. The optical lens as claimed in claim 1 wherein the glass lens being one of the third lens, the fourth lens and the fifth lens has an Abbe number of larger than 70.

13. The optical lens as claimed in claim 1 wherein the glass lens being one of the third lens, the fourth lens and the fifth lens has an Abbe number of larger than 80.

14. The optical lens as claimed in claim 1 wherein a full field of view of the optical lens is equal to or smaller than 155.4 degrees.

15. The optical lens as claimed in claim 1, wherein the optical lens satisfies the conditions:
SD1/R1<0.45 and 0.5<R1/TTL<1, where SD1 is a radius of a magnified-side surface of the first lens, R1 is a radius of curvature of the magnified-side surface of the first lens, and TTL is a total track length of the optical lens.

16. The optical lens as claimed in claim 15, wherein the optical lens satisfies one of the following conditions:
(1) the total track length of the optical lens is smaller than 20 mm;
(2) a full field of view of the optical lens is greater than 120 degrees;
(3) an F-number of the optical lens is larger than 1.8.

17. The optical lens as claimed in claim 15, wherein the optical lens has three plastic lenses and does not have any cemented lens.

18. The optical lens as claimed in claim 15, wherein respective shapes of the first lens to the fifth lens are meniscus, meniscus, biconvex, meniscus and biconvex.

19. The optical lens as claimed in claim 15, wherein a total number of lenses in the optical lens is no more than seven.

20. An optical lens comprising a first lens, a second lens, a third lens, a fourth lens and a fifth lens arranged in order from a magnified side to a minified side, a sum of refractive powers of the first lens and the second lens being negative, a sum of refractive powers of the third lens, the fourth lens and the fifth lens being positive, the first lens being a glass lens with a negative refractive power, the second lens being a plastic lens, the third lens, the fourth lens and the fifth lens being composed of one glass lens with an Abbe number of larger than 60 and two plastic lenses, and a displacement between a focal point of the optical lens measured at 85° C. and a focal point of the optical lens measured at −40° C. being less than 10 μm, wherein the second lens has a magnified-side concave surface and a minified-side convex surface, the fifth lens has a magnified-side convex surface and a minified-side convex surface, and the minified-side convex surface of the fifth lens is not provided with any inflection point.

* * * * *